US005171001A

United States Patent [19]

Sawdon

[11] Patent Number: 5,171,001

[45] Date of Patent: Dec. 15, 1992

[54] SEALED POWER CLAMP

[75] Inventor: Edwin G. Sawdon, St. Clair, Mich.

[73] Assignee: BTM Corporation, Marysville, Mich.

[21] Appl. No.: 667,504

[22] Filed: Mar. 11, 1991

Related U.S. Application Data

[63] Continuation-in-part of Ser. No. 639,491, Apr. 30, 1990, which is a continuation of Ser. No. 517,491, Apr. 30, 1990, abandoned, which is a continuation of Ser. No. 307,149, Feb. 3, 1989, abandoned, which is a continuation of Ser. No. 54,775, May 27, 1987, abandoned.

[51] Int. Cl.[5] ..... B23G 3/02

[52] U.S. Cl. ..... 269/32; 269/27; 269/93

[58] Field of Search ..... 269/24, 25, 27, 32, 269/228, 93

[56] References Cited

U.S. PATENT DOCUMENTS

| | | | |
|---|---|---|---|
| 1,667,616 | 4/1928 | Wright et al. . | |
| 1,736,171 | 11/1929 | Powell | 269/32 |
| 2,381,999 | 8/1945 | Bonnafe | 269/32 |
| 3,058,214 | 10/1962 | Mekler | 269/32 |
| 3,273,878 | 9/1966 | Blatt | 269/32 |
| 3,371,923 | 3/1968 | Blatt | 269/32 |
| 3,545,050 | 12/1970 | Blatt et al. | 24/248 |
| 3,618,931 | 11/1971 | Blatt | 269/94 |
| 3,702,185 | 11/1972 | Blatt | 269/32 |
| 4,240,620 | 12/1980 | Tunkers | 269/24 |
| 4,396,183 | 8/1983 | Lymburner | 269/32 |
| 4,445,676 | 5/1984 | Tunkers | 269/32 |
| 4,494,739 | 1/1985 | Valentine | 269/32 |
| 4,496,138 | 1/1985 | Blatt | 269/32 |
| 4,591,138 | 5/1986 | Baills et al. | 269/32 |
| 4,905,973 | 3/1990 | Blatt | 269/228 |

OTHER PUBLICATIONS

BTM Omni-Head Mini-Power Clamps "New Concept In Industrial Power Clamps Simplifies Off-Center Mounting", 4 pages.

BTM Thin Power Clamps-8 pages.

Dynamco "SL" Series Limit Valves (Bulletin 200)-5 pages.

*Primary Examiner*—J. J. Swann

*Attorney, Agent, or Firm*—Harness, Dickey & Pierce

[57] ABSTRACT

An offset powered toggle clamp which is very compact and in which the entirety of the actuating mechanism is fully enclosed so that it is sealed from contaminants, and can be permanently lubricated. The clamp also accommodates various clamping arm locations and orientations for different applications.

20 Claims, 4 Drawing Sheets

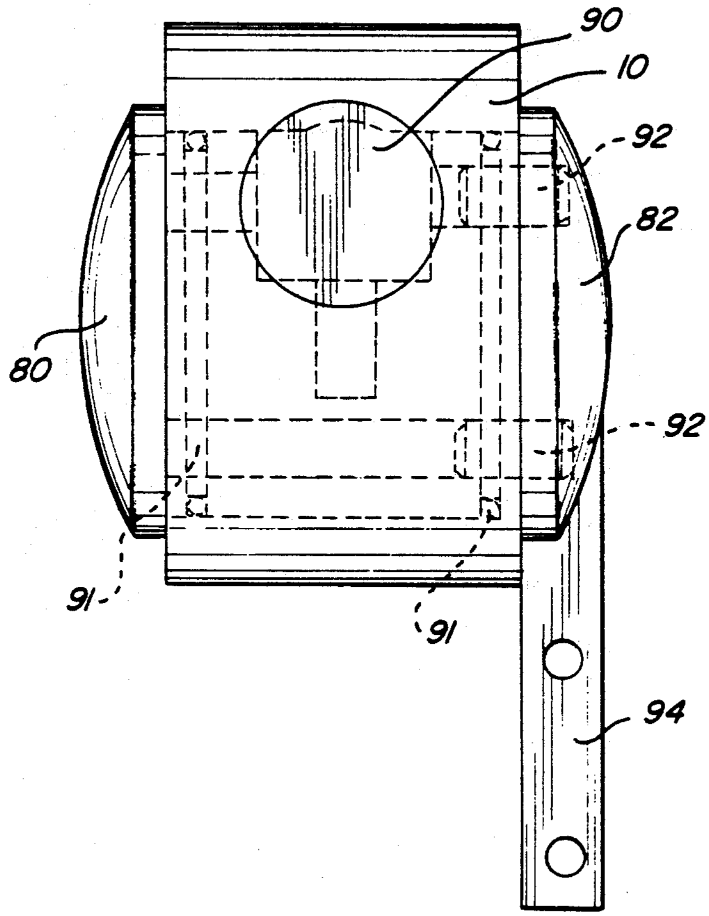
IFig-6
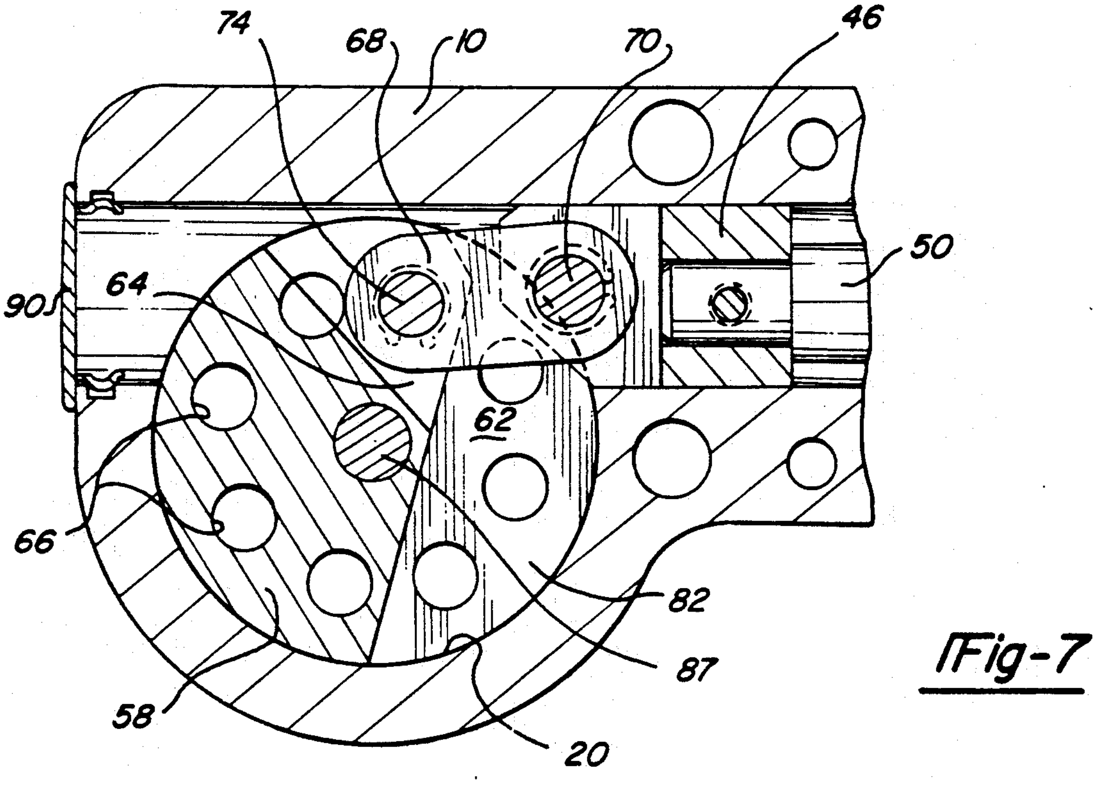
IFig-7

Fig-8
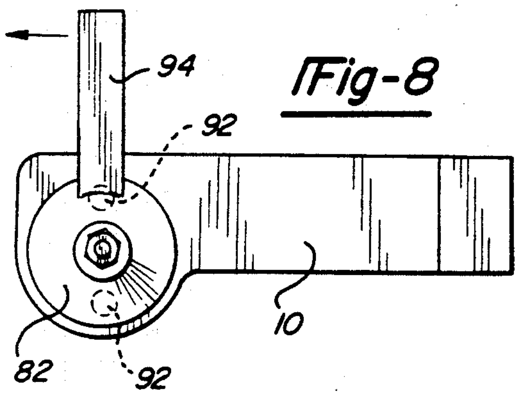
Fig-9
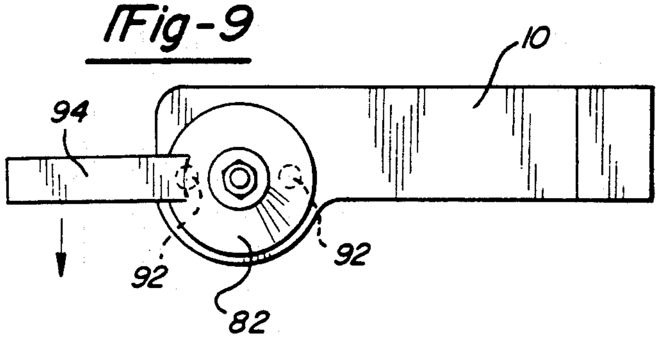
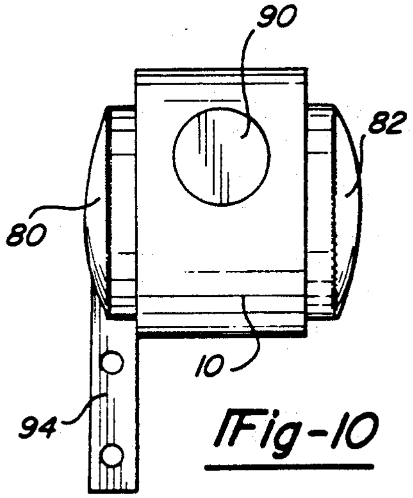
Fig-10
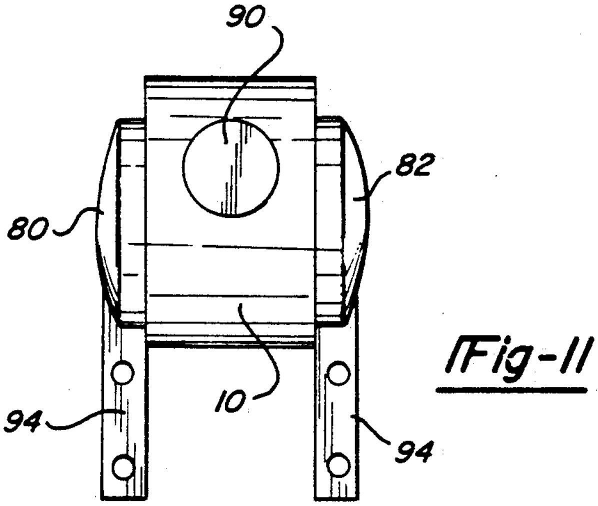
Fig-11

SEALED POWER CLAMP

CROSS-REFERENCE TO RELATED APPLICATION

This application in a continuation-in-part application of Ser. No. 638,491, filed Apr. 30, 1990 entitled Power Clamp, which is a continuation of Ser. No. 517,491, filed Apr. 30, 1990, now abandoned, which is a continuation of Ser. No. 307,149, filed Feb. 3, 1989, now abandoned which is a continuation of Ser. No. 54,775, filed May 27, 1987, now abandoned, the disclosure of which is incorporated herein by reference.

BACKGROUND AND SUMMARY OF THE INVENTION

This invention relates to clamping devices and particularly to a unique fully sealed fluid actuated offset power toggle clamp ideally suited for holding workpieces in fixture in adverse environments, such as those contaminated with weld splatter, saw chips, coolants, dust and dirt, and the like.

Power clamps are used in industrial applications for holding workpieces of many sizes and shapes during forming and machining operations. Such devices typically include a pneumatically or hydraulically actuated cylinder which causes one or more arms to move through a desired range of rotational motion to push against a workpiece. Depending on the specific application, the user may wish to actuate one arm or two arms, in some cases vertically aligned and in other cases horizontally aligned, as well as reversible, and often in the aforesaid contaminated environment.

In view of the above, it is an object of this invention to provide a fully sealed, permanently lubricated power clamp suited for broad application and being capable of use in even the most contaminated environments. A further object of this invention is to provide such a power clamp which is very compact, embodying a minimum of components, and one which is easily adapted by the user for various applications.

Additional benefits and advantages of the present invention will become apparent to those skilled in the art to which this invention relates and from the subsequent description of the preferred embodiments and the appended claims, taken in conjunction with the accompanying drawings.

BRIEF DESCRIPTION OF THE DRAWINGS

FIG. 6 is a front elevational view of the power clamp shown in FIG. 1;

FIG. 7 is a fragmentary longitudinal cross-sectional view similar to FIG. 3 showing the mechanism in a fully retracted position;

FIGS. 8 and 9 are diagrammatic side elevational views of a power clamp in accordance with the present invention showing two additional of the many alternative positions in which the clamping arm can be mounted when in the clamping position; and FIGS. 10 and 11 are front elevational views of the clamp of the present invention showing alternative mounting positions for the clamping arm or arms.

DESCRIPTION OF THE PREFERRED EMBODIMENT

Figure 1:
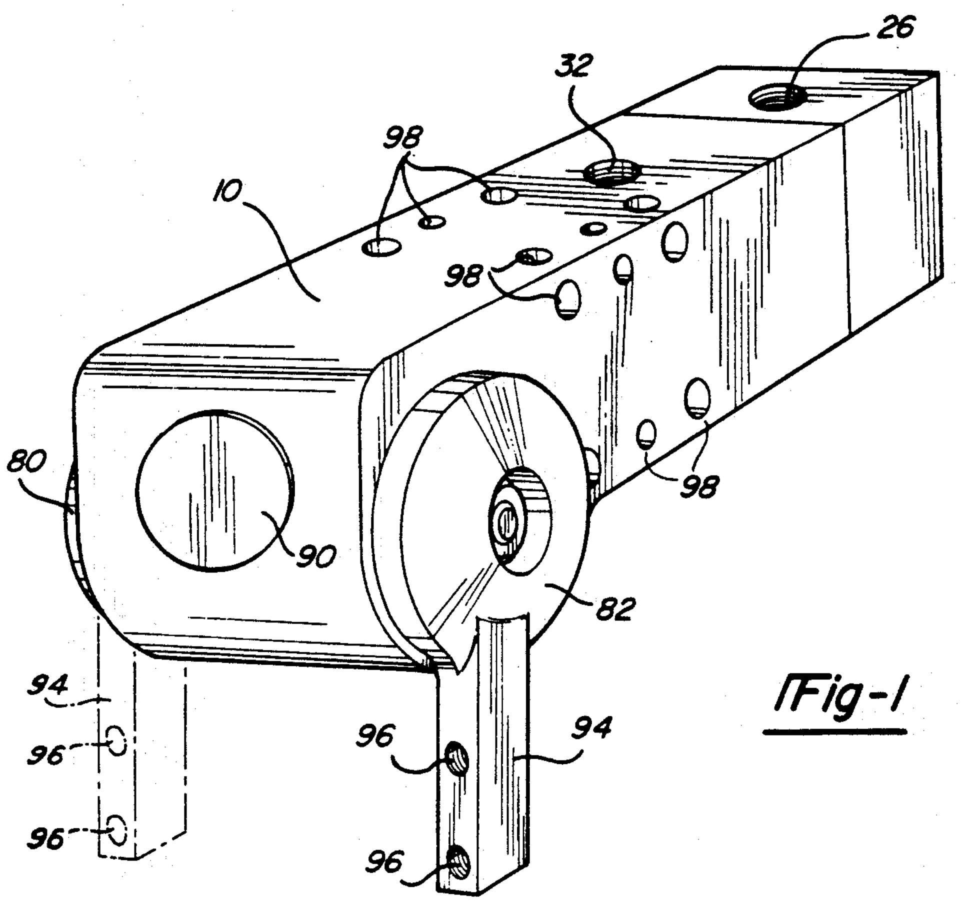
FIG. 1 is a perspective view of a power clamp according to the present invention.

With reference to the drawings, the power clamp of the present invention comprises a body 10 having at one end a bolted-on end cap 12 defining a sealed cylinder chamber 14 having a longitudinal axis and at the opposite end a cylindrical bore 16 concentric with said center axis, a smaller concentric bore 15 interconnecting bores 14 and 16 and provided with an elastomeric seal 17. Body 10 also defines an actuating chamber 18 having a circular cylindrical wall portion 20 extending for more than 180° about a transverse axis lying in a plane spaced from and disposed transversely to said longitudinal axis. Actuating chamber 18 intersects bore 16 and is open at each end, body 10 having generally flat parallel opposed surfaces 22 at the open ends of actuating chamber 18. End cap 12 is sealed to body 10 by an elastomeric seal 24, and has a central port 25 in fluid communication with threaded ports 26 and 28 to connect a supply of actuating fluid under pressure, and if desired a proximity sensor (not shown) to determine the position of the mechanism.

A power piston 30 is slidingly disposed in cylinder chamber 14 for powered movement in both directions along said longitudinal axis. Movement of piston 30 in the advance or clamping direction is caused by the supply of fluid under pressure via port 32 or 34 and port 25, and movement in the opposite or retracting direction is caused by pressurized fluid supplied through a threaded port 26 or 28 and corresponding port 36 or 38, respectively. If desired, the unused one of these latter ports may be provided with a proximity sensor (not shown) for sensing a probe 40 on piston 30, to thereby automatically determine when the piston is fully advanced. Suitable elastomeric seals 42 and 44 may be provided to increase the seal across piston 30.

A cylindrical slider member 46 is reciprocably slidable in bore 16 and has one end bifurcated to define a slot 48. A piston rod 50 is rigidly connected at one end to piston 30 by means of a threaded fastener 52, and at the opposite end to the non-bifurcated end of slider member 46 by means of a threaded fastener 54. The inner end of connecting rod 50 may be provided with a probe 56 to "cooperate" with a sensor in either one of ports 26 or 28 to automatically determine when the piston is in its fully retracted position.

A generally circular cylindrical drum-shaped actuating member 58 is rotationally disposed in actuating chamber 18 for rotational movement about said transverse axis and supported by wall 20, actuating member 58 having generally flat parallel opposite side faces 60 which are substantially flush with body surfaces 22 and a relatively wide centrally disposed first slot 62 in the peripheral surface thereof to provide clearance for slider member 46. Actuating member 58 also has a relatively narrow second slot 64 in the bottom of first slot 62, and a plurality of circumferentially disposed transverse through holes 66 which extend between side faces 60, holes 66 having center axes parallel to and at equal radii from said transverse axis and perferably being spaced 45° apart.

Linkage means comprising a link 68 having one end disposed in slider member slot 48 and being pivotally connected to the slider member by means of a pin 70 disposed in a transverse hole 72 through slider member 46, pin 70 being retained in place by a spaced pair of snap rings 73 disposed in appropriate groove in hole 72. The opposite end of link 68 is disposed in slot 64 and is pivotally connected to actuating member 58 by means of a pin 74 disposed in a transverse hole 76 in actuator member 58, and retained in place by a spaced pair of snap rings 78 located in suitable grooves in hole 76. As a consequence, movement of piston 30 in one direction causes actuating member 58 to rotate in one direction and movement of piston 30 in the opposite direction causes actuating member 58 to rotate in the opposite direction.

In order to fully seal the internal mechanism of the clamp, generally circular end plates 80 and 82 are disposed over and affixed by a centered double ended through bolt 87 and nuts 86 to each face 60 of actuating member 58. End plate 82 has a pair of diametrically opposed transverse holes 88 in the face thereof abutting actuating member 58, holes 88 being of the same diameter as and at the same radius from said transverse axis as the plurality of holes 66 in the actuating member 58. A pin 92 is fixedly disposed (i.e., press fit) in each of said holes 88 in cover plate 82, and upon assembly the two pins are removably inserted into a diametrically opposed pair of holes 66 in actuating member 58 in order to circumferentially position cover plate 82 with respect to actuating member 58 and to insure that cover plate 82 is positively rotatably driven by actuating member 58.

Figures 3, 4, 5:
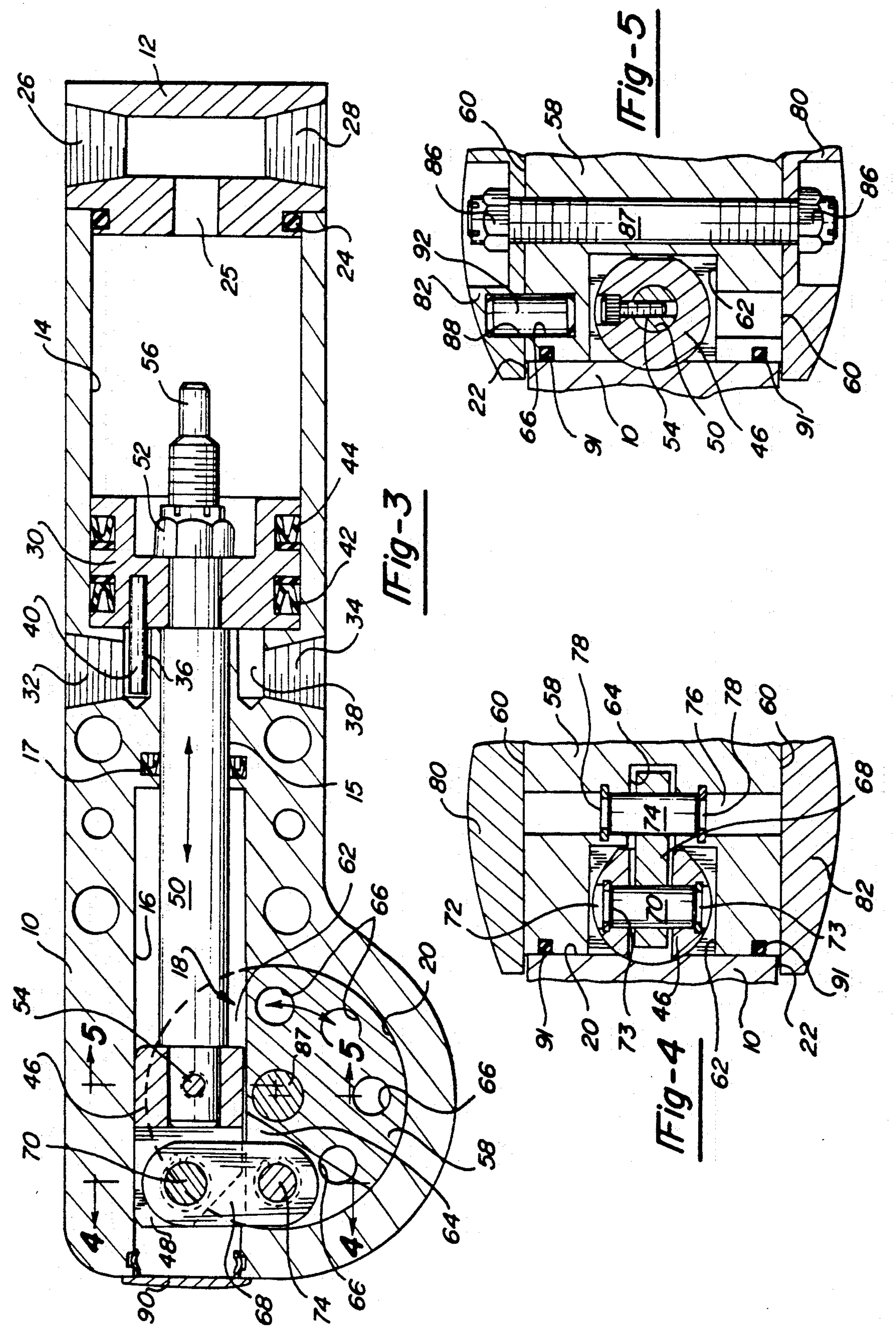
FIG. 3 is a longitudinal vertical cross-section view of the power clamp shown in FIG. 1 taken generally through the center thereof and showing the mechanism in a fully advanced clamping position.
FIG. 4 is a transverse cross-sectional view taken along line 4—4 in FIG. 3.
FIG. 5 is a transverse cross-sectional view taken along line 5—5 in FIG. 3.

As can be seen, each said cover plate overlies the adjacent surface of the body to substantially seal the actuating chamber from contaminants and to permanently retain lubricant. Because bore 16 has to be formed from the left hand end of the body, as shown in FIG 3, sealing of the internal mechanism is further effected by means of a snap-in cap 90. Sealing is further enhanced by a pair of generally parallel spaced O-rings 91 between actuator member 58 and body 10.

Figure 2:
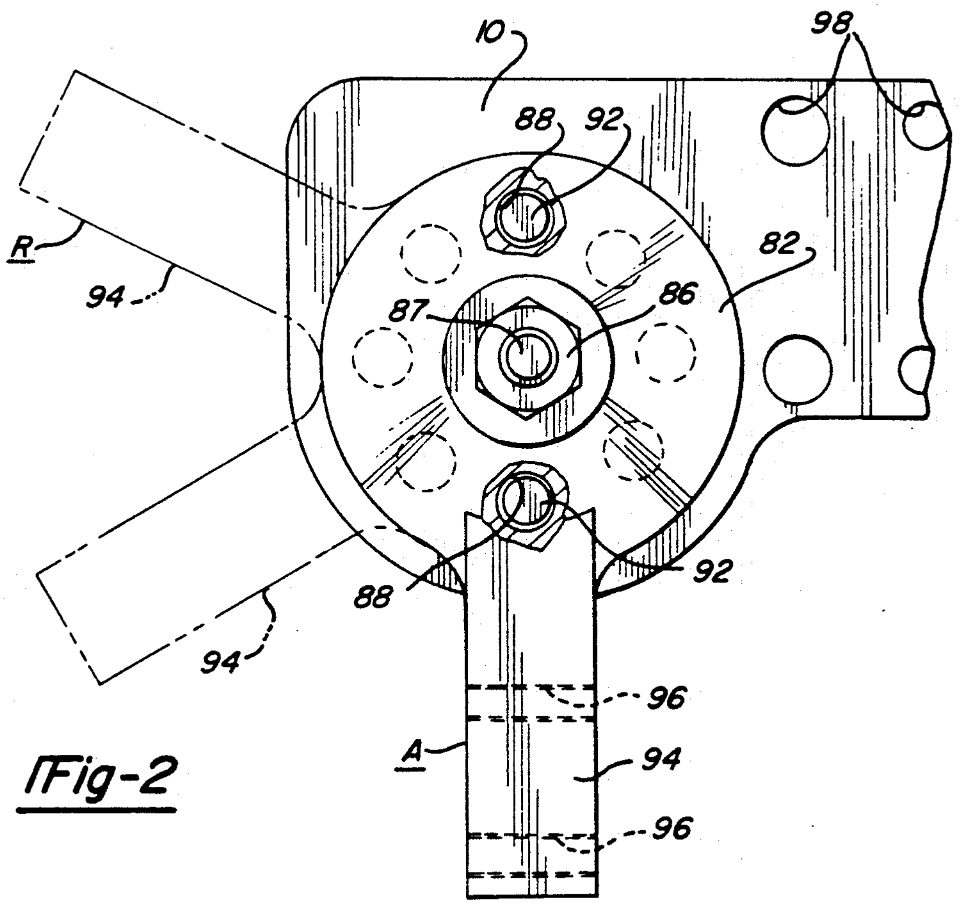
FIG. 2 is a side elevational view of the front portion of the power clamp shown in FIG. 1 showing the range of motion of the clamping arm.

Rigidly affixed, to or integral with, cover plate 82 is a generally radially extending clamping arm 94 rotatable along with cover or end plate 82 and actuating member 58, as mentioned above, between an advanced clamping position A, as shown in solid lines in FIG. 2, and a retracted unclamping position R, as shown in phantom lines in FIG. 2, upon actuation of said piston in respective opposite directions, respectively. As one skilled in the art will readily appreciate, another cover or end plate 82, with another clamping arm 94, can optionally be substituted for the cover plate 80, thereby providing clamping action on either or both ends of the power clamp device, as is illustrated by way of phantom lines in FIG. 1. Alternatively, another clamping arm 94 can be provided on the cover or end plate 80 in addition to, or in lieu of, the cover plate 82. Threaded holes 96 may be provided in arm 94 to accommodate soft pads, small fixtures, holding devices, and the like. Also, any number of mounting holes 98 may be provided on body 10 in order to facilitate mounting the clamp body 10 wherever desired.

Alternate clamping positions of arm 94 are illustrated in FIG. 8 (the arm is vertical) and in FIG. 9 (the arm is horizontal). These positions are easily established by removing the cover plate and repositioning pins 92 in different pairs of holes in the actuating member. Furthermore, the clamping arm can be located on the opposite side of the clamp (FIG. 10) using the other ends of holes 66 or clamping arms can be located on both sides of the clamp (FIG. 11).

In all embodiments of the present invention the clamp should be installed so that full clamping takes place at or near the "center" position of the toggle linkage, i.e., within 5°, and preferably short of "center". Where power is no problem, a slightly overcenter setting may be used to ensure that maximum clamping forces will be achieved.

While the above description constitutes the preferred embodiment of the present invention, it will be appreciated that the invention is susceptible to modification, variation and change without departing from the proper scope or fair meaning of the accompanying claims.

I claim:

1. A powered clamp, comprising:

(a) a body having a sealed cylinder chamber therein, with said cylinder chamber having a longitudinal axis, a cylindrical bore in communication with said cylinder chamber and concentric with said longitudinal axis, and an actuating chamber in said body, with said actuating chamber having a circular cylindrical wall portion extending for more than 180° about an axis lying in a plane spaced from and disposed transversely to said longitudinal axis, said actuating chamber intersecting said bore and being open at each end, said body having generally flat parallel opposed surfaces at the open ends of said actuating chamber;

(b) a piston slidably disposed in said cylinder chamber for powered movement in both directions along said longitudinal axis;

(c) a cylindrical slider member reciprocably slidable in said bore and having one end bifurcated to define a slot;

(d) a piston rod interconnecting said piston and the other end of said slider member for powering the latter;

(e) a generally circular cylindrical actuating member rotationally disposed in said actuating chamber for rotational movement about said transverse axis, said actuating member having generally flat parallel opposite side faces which are substantially flush with said body surface, (i) said actuating member having a relatively wide centrally disposed first slot in the peripheral surface thereof to provide clearance for said slider member, said first slot having a bottom, (ii) means defining a relatively narrow second slot in the bottom of said first slot, (iii) a plurality of circumferentially disposed transverse holes in one of said side faces, said holes having center axes parallel to and at equal radii from said transverse axis;

(f) linkage means having one end disposed in said slider member slot and being pivotally connected to said slider member, and at the opposite end being disposed in said second slot and pivotally connected to said actuating member so that movement of said piston in one direction causes said actuating member to rotate in one direction and movement of said piston in the opposite direction causes said actuating member to rotate in the opposite direction;

(g) a generally circular end plate disposed over and affixed to each side face of said actuating member, one of said end plates having a transverse hole in the face thereof, said last-mentioned hole being of the same diameter as and at the same radius from said transverse axis as said plurality of holes, each said end plate overlying said adjacent surface of said body to substantially seal said actuating chamber;

(h) a pin disposed in said hole in at least one of said end plates and one of said plurality of holes in said actuating member in order to circumferentially position said end plate with respect to said actuating member and to ensure that said one end plate is rotatably driven by said actuating member; and (i) a clamping arm affixed to said one of said end plates, said arm rotating between an advanced clamping position and a retracted unclamping position upon actuating of said piston in both directions.

2. A powered clamp as claimed in claim 1 wherein said linkage means is a toggle linkage.

3. A powered clamp as claimed in claim 1 further comprising an elastomeric seal between said body and said actuating member adjacent each end thereof.

4. A powered clamp as claimed in claim 1 wherein said one of said end plates can be mounted to said actuating member at a plurality of different angular positions by positioning said pin in different ones of said plurality of transverse holes.

5. A powered clamp as claimed in claim 1 wherein either of said end plates can have a clamping arm affixed thereto.

6. A powered clamp as claimed in claim 1 wherein both of said end plates has a clamping arm affixed thereto.

7. A powered clamp, comprising:

(a) a body having a longitudinal axis and having an actuating chamber therein, said actuating chamber having a circular cylindrical wall portion extending for more than 180° about an axis lying in a plane spaced from and disposed transversely to said longitudinal axis, said actuating chamber being open at each end, said body having generally flat parallel opposed surfaces at the open ends of said actuating chamber;

(b) a power means interconnected with said powered clamp and being operable in two directions;

(c) a generally circular cylindrical actuating member rotationally disposed in said actuating chamber for rotative movement about said transverse axis, said actuating member having generally flat parallel opposite side faces which are substantially flush with said body surface;

(d) linkage means interconnecting said power means and said actuating member for rotating said actuating member in one rotational direction in response to operation of said power means in one of said two directions and for rotating said actuating member in the opposite rotational direction in response to operation of said power means in the other of said two directions;

(e) a generally circular end plate disposed over and affixed to each side face of said actuating member, each said end plate overlying said adjacent surface of said body to substantially seal said actuating chamber; and (f) a clamping arm affixed to one of said end plates for rotation therewith between an advanced clamping position and a retracted unclamping position in response to operation of said power means.

8. A powered clamp as claimed in claim 7 wherein either of said end plates can have a clamping arm affixed thereto.

9. A powered clamp as claimed in claim 7 wherein both of said end plates has a clamping arm affixed thereto.

10. A powered clamp as claimed in claim 7 wherein said linkage means includes toggle linkage means to increase clamping forces.

11. A powered clamp as claimed in claim 7 further comprising an elastomeric seal between said body and said actuating member adjacent the ends thereof.

12. A powered clamp as claimed in claim 7 further comprising a plurality of circumferentially disposed transverse holes in one of said side faces, said holes having center axes parallel to and at equal radii from said transverse axis, and wherein one of said end plates has a transverse hole in the face thereof abutting said actuating member, said last-mentioned hole being of the same diameter as and at the same radius from said transverse axis as said plurality of holes.

13. A powered clamp as claimed in claim 12 wherein said transverse holes are through holes communicating with both opposed side faces of said actuating member.

14. A powered clamp, comprising:

(a) a body having a longitudinal axis and having an actuating chamber therein disposed transversely to said longitudinal axis, said actuating chamber being open at each end;

(b) power means interconnected with said powered clamp operable in two directions;

(c) a generally circular cylindrical actuating member rotationally disposed in said actuating chamber for rotative movement about a transverse axis spaced from and being transverse to said longitudinal axis, said actuating member having generally flat parallel opposite side faces which are substantially flush with the adjacent surfaces of said body, said actuating member further having a plurality of circumferentially disposed transverse holes in one of said side faces, said holes having center axes parallel to and at equal radii from said transverse axis;

(d) linkage means interconnecting said power means and said actuating member for rotating said actuating member in one rotational direction in response to operation of said power means in one of said two directions and for rotating said actuating member in the opposite rotational direction in response to operation of said power means in the other of said two directions;

(e) a generally circular end plate disposed over and affixed to each side face of said actuating member, one of said end plates having a transverse hole in the face thereof, said last-mentioned hole being of the same diameter as and at the same radius from said transverse axis as said plurality of holes, each said cover plate overlying said adjacent surface of said body to substantially seal said actuating chamber;

(f) a pin disposed in said hole in said one of said end plates and one of said plurality of holes in said actuating member in order to circumferentially position said cover plate with respect to said actuating member and to ensure that said one cover plate is rotatably driven by said actuating member; and (g) a clamping arm affixed to said one of said end plates for rotation therewith between an advanced clamping position and a retracted unclamping position in response to operation of said power means.

15. A powered clamp as claimed in claim 14 wherein either of said end plates can have a clamping arm affixed thereto.

16. A powered clamp as claimed in claim 14 wherein both of said end plates has a clamping arm affixed thereto.

17. A powered clamp as claimed in claim 14 wherein said one of said cover plates can be mounted to said actuating member at a plurality of different angular positions by positioning said pin in different ones of said plurality of transverse holes.

18. A powered clamp as claimed in claim 14 wherein said transverse holes are through holes communicating with both opposed side faces of said actuating member.

19. A powered clamp as claimed in claim 18 wherein both of said end plates has a clamping arm affixed thereto.

20. A powered clamp, comprising:

(a) a body having a sealed cylinder chamber therein, with said cylinder chamber having a longitudinal axis, a cylindrical bore in communication with said cylinder chamber and concentric with said longitudinal axis, and an actuating chamber disposed transversely to said longitudinal axis, said actuating chamber being open at each end;

(b) a piston slidably disposed in said cylinder chamber for powered movement in both directions along said longitudinal axis;

(c) a cylindrical slider member reciprocably slidable in said bore and having one end bifurcated to define a slot;

(d) a piston rod interconnecting said piston and the other end of said slider member for powering the latter;

(e) a generally circular cylindrical actuating member rotationally disposed in said actuating chamber for rotative movement about a transverse axis spaced from and being transverse to said longitudinal axis, (i) said actuating member having a relatively wide centrally disposed first slot in the peripheral surface thereof to provide clearance for said slider member, (ii) means defining a relatively narrow second slot in the bottom of said first slot, (f) linkage means having one end disposed in said slider member slot and being pivotally connected to said slider member, and at the opposite end being disposed in said second slot and pivotally connected to said actuating member so that movement of said piston in one direction causes said actuating member to rotate in one direction and movement of said piston in the opposite direction causes said actuating member to rotate in the opposite direction;

(g) a generally circular end plate disposed over each of the open ends of said actuating chamber and affixed to said actuating member; and (h) a clamping arm affixed to one of said end plates for rotation therewith between an advanced clamping position and a retracted unclamping position in response to operation of said piston in both directions.

* * * * *

UNITED STATES PATENT AND TRADEMARK OFFICE

CERTIFICATE OF CORRECTION

PATENT NO. : 5,171,001

DATED : December 15, 1992

INVENTOR(S) : Edwin G. Sawdon

It is certified that error appears in the above-identified patent and that said Letters Patent is hereby corrected as shown below:

On the title page, under Related U.S. Application Data: "639,491" should be -- 639,724 --.

Column 1, line 7, "638,491" should be -- 639,724 --.

Column 2, line 53, " "cooperate" " should be -- cooperate --.

Signed and Sealed this

Twenty-fifth Day of January, 1994

Attest:

BRUCE LEHMAN

*Attesting Officer* — *Commissioner of Patents and Trademarks*